(12) United States Patent
Ozaki et al.

(10) Patent No.: US 10,419,237 B2
(45) Date of Patent: Sep. 17, 2019

(54) SLAVE DEVICE, CONTROL METHOD OF SLAVE DEVICE, INFORMATION PROCESSING PROGRAM AND RECORDING MEDIUM

(71) Applicant: OMRON Corporation, Kyoto (JP)

(72) Inventors: Toshiyuki Ozaki, Ritto (JP); Yasuhiro Kitamura, Ritto (JP)

(73) Assignee: OMRON Corporation, Kyoto (JP)

( * ) Notice: Subject to any disclaimer, the term of this patent is extended or adjusted under 35 U.S.C. 154(b) by 118 days.

(21) Appl. No.: 15/410,782

(22) Filed: Jan. 20, 2017

(65) Prior Publication Data

US 2017/0264455 A1    Sep. 14, 2017

(30) Foreign Application Priority Data

Mar. 14, 2016    (JP) .................................. 2016-049319

(51) Int. Cl.
| | |
|---|---|
| G06F 15/16 | (2006.01) |
| H04L 12/40 | (2006.01) |
| G05B 19/05 | (2006.01) |
| H04L 29/08 | (2006.01) |
| H04L 12/403 | (2006.01) |

(52) U.S. Cl.
CPC ............ *H04L 12/40* (2013.01); *G05B 19/054* (2013.01); *H04L 12/403* (2013.01); *H04L 12/40006* (2013.01); *H04L 12/40032* (2013.01); *H04L 67/125* (2013.01); *G05B 2219/1215* (2013.01); *H04L 2012/40208* (2013.01)

(58) Field of Classification Search
CPC ............... H04L 12/40; H04L 12/40006; H04L 12/40032; H04L 12/403; H04L 67/125; H04L 2012/40208; G05B 19/054; G05B 2219/1215
USPC .......................................................... 709/206
See application file for complete search history.

(56) References Cited

U.S. PATENT DOCUMENTS

| | | | |
|---|---|---|---|
| 4,366,478 A * | 12/1982 | Masuda .................. | H04L 25/45 340/1.1 |
| 6,487,693 B1 * | 11/2002 | Kim ..................... | H03M 13/299 714/780 |
| 2003/0200323 A1 | 10/2003 | Dold et al. | |

(Continued)

FOREIGN PATENT DOCUMENTS

| | | |
|---|---|---|
| DE | 102011006590 | 5/2012 |
| EP | 1168271 | 1/2002 |

(Continued)

OTHER PUBLICATIONS

"Search Report of Europe Counterpart Application", dated May 23, 2017, p. 1-p. 9.

(Continued)

*Primary Examiner* — Taylor A Elfervig
(74) *Attorney, Agent, or Firm* — JCIPRNET

(57) ABSTRACT

The present invention aims to reduce an operation burden related to the change of reception processing in a master device when a device connected to a slave device is changed. A device communication managing unit (10) transmits the data received by a device (20) communicating with a device communication port (110) in a first mode to a field network (50) by using a data format used for transmitting the data received by the device (20) communicating in a second mode.

3 Claims, 7 Drawing Sheets

(56) References Cited

U.S. PATENT DOCUMENTS

| | | | | |
|---|---|---|---|---|
| 2013/0086244 | A1* | 4/2013 | Besold | H04L 67/12 709/223 |
| 2014/0229641 | A1* | 8/2014 | Chen | G06F 13/4291 710/74 |
| 2015/0317351 | A1* | 11/2015 | Cheng | G06F 11/1446 707/623 |
| 2015/0381284 | A1* | 12/2015 | Maejima | H04B 10/564 398/25 |

FOREIGN PATENT DOCUMENTS

| | | |
|---|---|---|
| JP | H04321105 | 11/1992 |
| JP | 2001075613 | 3/2001 |
| JP | 2008-152317 | 7/2008 |

OTHER PUBLICATIONS

Office Action of China Counterpart Application, with English translation thereof, dated Dec. 19, 2018, pp. 1-13.

"Office Action of Japan Counterpart Application," dated Aug. 28, 2018, with English translation thereof, p. 1-p. 6.

* cited by examiner

| Mode | Comparing function | IO MAP |
|---|---|---|
| Second mode | Validation | "second mode input data" of each port |
| First mode (input) | Invalidation | First mode input data (Port number corresponds to a bit offset position) |
| First mode (output) | Invalidation | First mode output data (Port number corresponds to a bit offset position) |

| Word Offset | Bit15 | ... | | | | | Bit0 |
|---|---|---|---|---|---|---|---|
| +0 | | ... | | DI4 | DI3 | DI2 | DI1 |

FIG. 5(B-1)

| Word Offset | Bit15 | ... | Status | Status | Status | Status | Bit0 |
|---|---|---|---|---|---|---|---|
| +0 | | ... | | | | | DI1 |
| +1 | Analog data | | | | | | |

FIG. 5(B-2)

| Word Offset | Bit15 | ... | Status | Status | Status | Status | Bit0 |
|---|---|---|---|---|---|---|---|
| +0 | | ... | | | | | DI2 |
| +1 | Analog data | | | | | | |

FIG. 5(B-3)

| Word Offset | Bit15 | ... | Status | Status | Status | Status | Bit0 |
|---|---|---|---|---|---|---|---|
| +0 | | ... | | | | | DI3 |
| +1 | Analog data | | | | | | |

FIG. 5(B-4)

| Word Offset | Bit15 | ... | Status | Status | Status | Status | Bit0 |
|---|---|---|---|---|---|---|---|
| +0 | | ... | | | | | DI4 |
| +1 | Analog data | | | | | | |

| Mode | Comparing function | IO MAP |
|---|---|---|
| Second mode | Validation | "second mode input data" of each port |
| First mode | Cancellation | "second mode input data" of each port (wherein, "first mode input data": bit 0. "fixed value (for example, 『0』)" : bit1~bit15 etc.) |

FIG. 6

When the comparing function is validated

Bit15                                                                 Bit0

| Status | DI |
|---|---|
| Analog value | |

FIG. 7(A)

When the comparing function is cancelled

Bit15                                                                 Bit0

| fixed to be 0 | DI |
|---|---|
| fixed to be 0 | |

| Word Offset | Bit15 | ... | Bit0 |
|---|---|---|---|
| +0 | Status | Status Status Status ... | Status |
| +1 | Analog data | | DI1 |

FIG. 8(B-2)

| Word Offset | Bit15 | ... | Bit0 |
|---|---|---|---|
| +0 | 0 | 0 0 0 ... 0 | 0 |
| +1 | | fixed to be 0 | DI2 |

FIG. 8(B-3)

| Word Offset | Bit15 | ... | Bit0 |
|---|---|---|---|
| +0 | Status | Status Status Status ... | Status |
| +1 | Analog data | | DI3 |

FIG. 8(B-4)

| Word Offset | Bit15 | ... | Bit0 |
|---|---|---|---|
| +0 | Status | Status Status Status ... | Status |
| +1 | Analog data | | DI4 |

SLAVE DEVICE, CONTROL METHOD OF SLAVE DEVICE, INFORMATION PROCESSING PROGRAM AND RECORDING MEDIUM

CROSS-REFERENCE TO RELATED APPLICATION

This application claims the priority benefit of Japan application no. 2016-049319, filed on Mar. 14, 2016. The entirety of the above-mentioned patent applications is hereby incorporated by reference herein and made a part of this specification.

BACKGROUND OF THE INVENTION

1. Field of the Invention

The present invention relates to a slave device being connected to a master device through a network and having a communication port for connecting a device.

2. Description of Related Art

In the past, there is a known master-slave control system, which includes a master device and a slave device connected to the master device through a network.

For example, a programmable controller is recorded in the following patent document 1, in which an input/output unit connected to a basic unit is replaced with an input/output unit of the same variety under the condition of no comparison and judgment.

EXISTING TECHNICAL DOCUMENT

Patent Document

[Patent document 1] Japanese Patent No. 2008-152317 gazette (published on Jul. 3, 2008)

SUMMARY OF THE INVENTION

Problem to be Solved by the Invention

But, the prior art as abovementioned does not give any hint about the replacement of a device connected to the slave device and a comparison function of the device.

The present invention aims to realize a slave device, etc., the device connected to the slave device can be more easily connected without changing the reception processing, etc., in the master device.

Technical Means Solving the Problem

In order to solve the problem, the slave device of the present invention is connected to a controller as the master device through a network and has a communication port for connecting a the device, the slave device comprising: a mode setting part for setting the device connected to the communication pot to communicate in a first mode or a second mode, wherein the first mode is a mode of only receiving 1-bit data and the second mode is a mode of receiving more than 1 bit of data; and a transmitting part for transmitting the data received from the device communicating in the first mode to the network in a data format when the mode setting part sets the first mode, wherein the data format is used for transmitting the data received from the device to the network when the mode setting part sets the second mode.

According to the configuration, the transmitting part transmits the data acquired from the device to the network when the first mode is set by using the data format for transmitting the data acquired from the device to the network when the mode setting part sets the second mode. That is, the slave device transmits the data acquired from the device to the network by using the data format no matter communicating with the device in the first mode or the second mode.

Herein, under the condition that the data format used for transmission to the network is different according to the fact that the communication is carried out in the first mode or the second mode, the controller must acquire the following information. That is, the controller must acquire the information related to the data received by the controller from the device is the data received from the device in the first mode or the data received from the device in the second mode. Besides, the controller must acquire the information related to how the data received from the device in the first mode is stored to the data format corresponding to the first mode, and how the data received from the device in the second mode is stored to the data format corresponding to the second mode.

In another aspect, the slave device transmits the data received from the device to the network by using the data format no matter communicating with the device in the first mode or the second mode.

Therefore, the slave device achieves the effects that the data format used for transmitting the data received from the device to the network can be simplified, and the processing in the slave device and the controller can also be simplified.

Besides, the slave device uses the shared data format to transmit the data received from the device to the network no matter communicating with the device in the first mode or the second mode, and thus achieves the effects that the device connected to the slave device can be easily replaced without changing the reception processing in the master device, etc.

According to the slave device of the present invention, optionally, the transmitting part stores the 1-bit data received from device in a predetermined position of the data format and stores a predetermined value in a position except for the predetermined position of the data format when the mode setting part sets the first mode.

According to the configuration, the transmitting part stores the 1-bit data received from device in a predetermined position of the data format and stores a predetermined value in a position except for the predetermined position of the data format when the mode setting part sets the first mode. That is, the slave device uses the data format to transmit the data received from the device to the network no matter communicating with the device in the first mode or the second mode, and stores the data received from the device in the first mode in the predetermined position of the data format.

Therefore, the slave device achieves the effects that when the data format is used to transmit the data received from the device to the network in the first mode, the slave device is unnecessarily to notify the controller the data received from the device in the first mode is stored to which position of the data format every time. That is, the slave device achieves the effects that the data format used for transmitting the data received from the device to the network can be simplified, and the processing in the slave device and the controller can also be simplified.

The slave device of the present invention can also comprise: a storage part for storing configuration information which includes recognition information of a device predetermined to be connected to the communication port; and a comparing part for executing comparison processing when the mode setting mode sets the second mode, and executing no comparison processing when the mode setting mode sets the first mode, wherein the comparison processing is a judgment on the consistency of the recognition information of the device included in the data received from the device and larger than 1 bit and the recognition information included in the configuration information stored by the storage part.

According to the configuration, the comparing part 106 executes comparison processing when the mode setting mode sets the second mode, and executes no comparison processing when the mode setting mode sets the first mode, wherein the comparison processing is a judgment on the consistency of the recognition information of the device included in the data received from the device and larger than 1 bit and the recognition information included in the configuration information stored by the storage part. That is, the slave device confirms whether the device connected to the communication port and the device predetermined to be connected to the communication port are consistent or not when the modes setting mode sets the second mode, and does not confirm whether the device connected to the communication port and the device predetermined to be connected to the communication port are consistent or not when the modes setting mode sets the first mode.

For example, when the device predetermined to be connected to the communication port in the second mode is replaced with the device connected to the communication port in the first mode, the slave device executes no comparison processing on the device communicating with the communication port in the first mode.

Therefore, the effects that a user can easily replace the device predetermined to be connected to the communication port in the second mode with the device connected to the communication port in the first mode by using the slave device can be achieved.

According to the slave device of the present invention, optionally, IO-Link® is used to communicate with the device.

According to the configuration, the slave device achieves the effects that IO-Link® can be used to communicate with the device.

In order to solve the problem, a control method of the present invention is a control method of a slave device which is connected to a controller as the master device through a network and has a communication port for connecting a device. The control method comprises: a mode setting step for setting the device connected to the communication pot to communicate in a first mode or a second mode, wherein the first mode is a mode of only receiving 1-bit data and the second mode is a mode of receiving more than 1 bit of data; and a transmitting step for transmitting the data received from the device communicating in the first mode to the network in a data format when the mode setting part sets the first mode, wherein the data format is used for transmitting the data received from the device to the network when the mode setting part sets the second mode.

According to the method, the transmitting step transmits the data acquired from the device to the network when the first mode is set by using the data format used for transmitting the data acquired from the device to the network when the mode setting step sets the second mode. That is, the control method transmits the data acquired from the device to the network by using the data format no matter the device communicates in the first mode or the second mode.

Herein, under the condition that the data format used for transmission to the network is different according to the fact that the communication is carried out in the first mode or the second mode, the controller must acquire the following information. That is, the controller must acquire the information related to the data received by the controller from the device is the data received from the device is in the first mode or the data received from the device in the second mode. Besides, the controller must acquire the information related to how the data received from the device in the first mode is stored to the data format corresponding to the first mode, and how the data received from the device in the second mode is stored to the data format corresponding to the second mode.

In another aspect, the control method transmits the data received from the device to the network by using the data format no matter the communication with the device is in the first mode or the second mode. Therefore, the control method achieves the effects that the data format used for transmitting the data received from the device to the network can be simplified, and the processing in the slave device and the controller can also be simplified.

Besides, the method uses the shared data format to transmit the data received from the device to the network no matter the device communicates in the first mode or the second mode, and thus achieves the effects that the device connected to the slave device can be easily replaced without changing the reception processing in the master device, etc.

Effects of the Invention

The present invention achieves the effects that the device connected to the slave device can be easily replaced without changing the reception processing in the master device, etc.

BRIEF DESCRIPTION OF THE DRAWINGS

FIG. 4 is a diagram illustrating a case that validation/invalidation of an IO map allocated to a host controller by a conventional device communication managing unit and a comparison function is associated with a communication mode.

FIG. 5(A) and FIGS. 5(B-1)-5(B-4) are diagrams illustrating the data transmitted by the conventional device communication managing unit to a host controller according to a communication mode and a device communication port.

FIG. 6 is a diagram illustrating a case that the IO map allocated to the host controller by the device communication managing unit in FIG. 1 is always same regardless of the communication mode.

FIG. 7(A) and FIG. 7(B) are diagrams illustrating a case that for the data transmitted to the host controller by the device communication managing unit in FIG. 1, a data format/IO map is switched not according to the communication mode.

FIGS. 8(B-1) to 8(B-4) are diagrams representing the data transmitted to the host controller by the device communication managing unit in FIG. 1 according to a communication mode and a device communication port.

DESCRIPTION OF THE EMBODIMENTS

Embodiment 1

Figure 1:
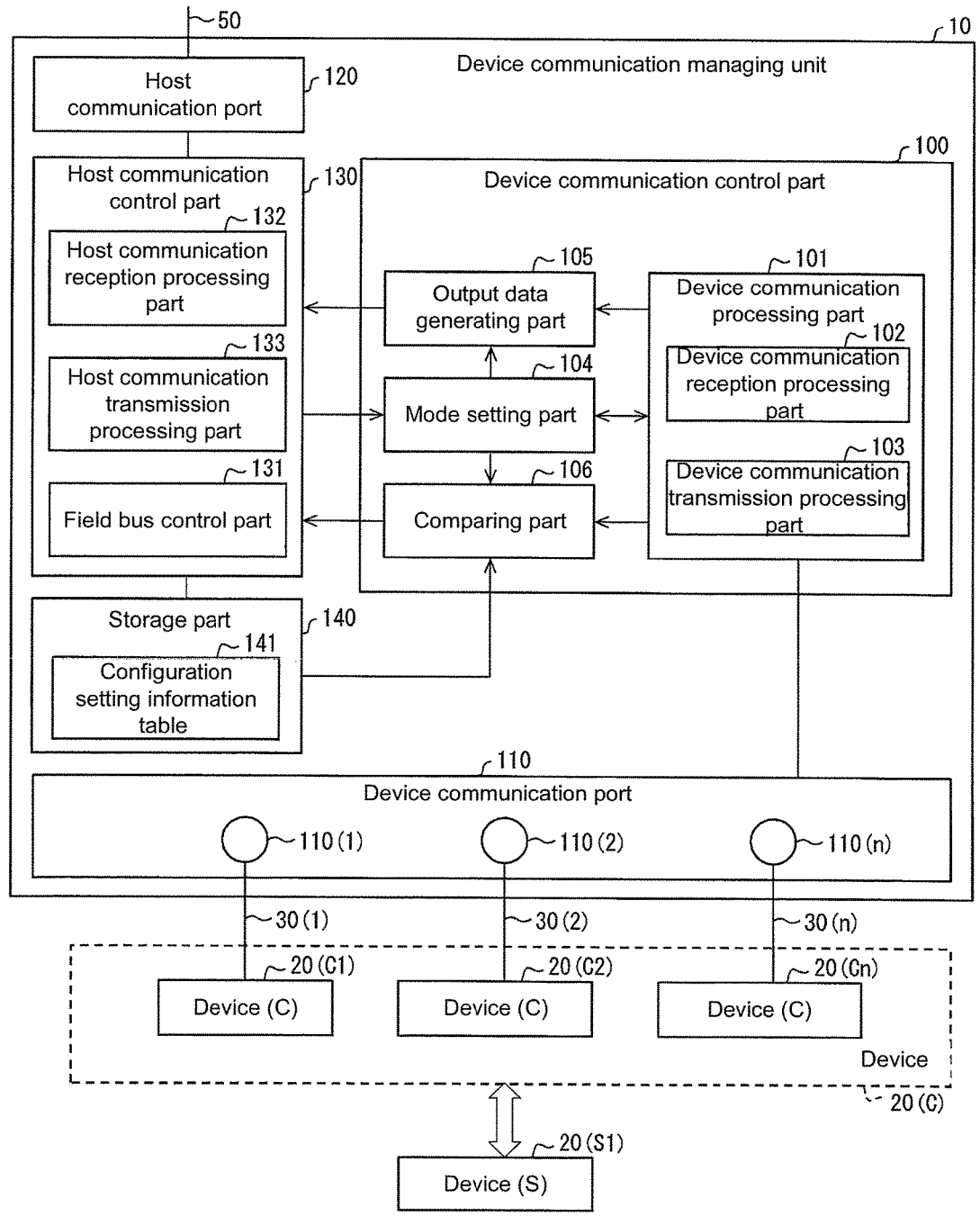
FIG. 1 is a block diagram illustrating main parts of a device communication managing unit of an embodiment 1 of the present invention.

Hereinafter, the embodiment 1 of the present invention is described in detail based on FIG. 1 and FIGS. 8(B-1) to 8(B-4). The same or equivalent parts in the drawings are marked with the same signs and the description thereof is not repeated. In order to conveniently understand a device communication managing unit 10 (slave device) in a form of the present invention, an outline of a control system 1 including the device communication managing unit 10 is described with reference to FIG. 2.

[Outline of the Control System of Embodiment 1]

Figure 2:
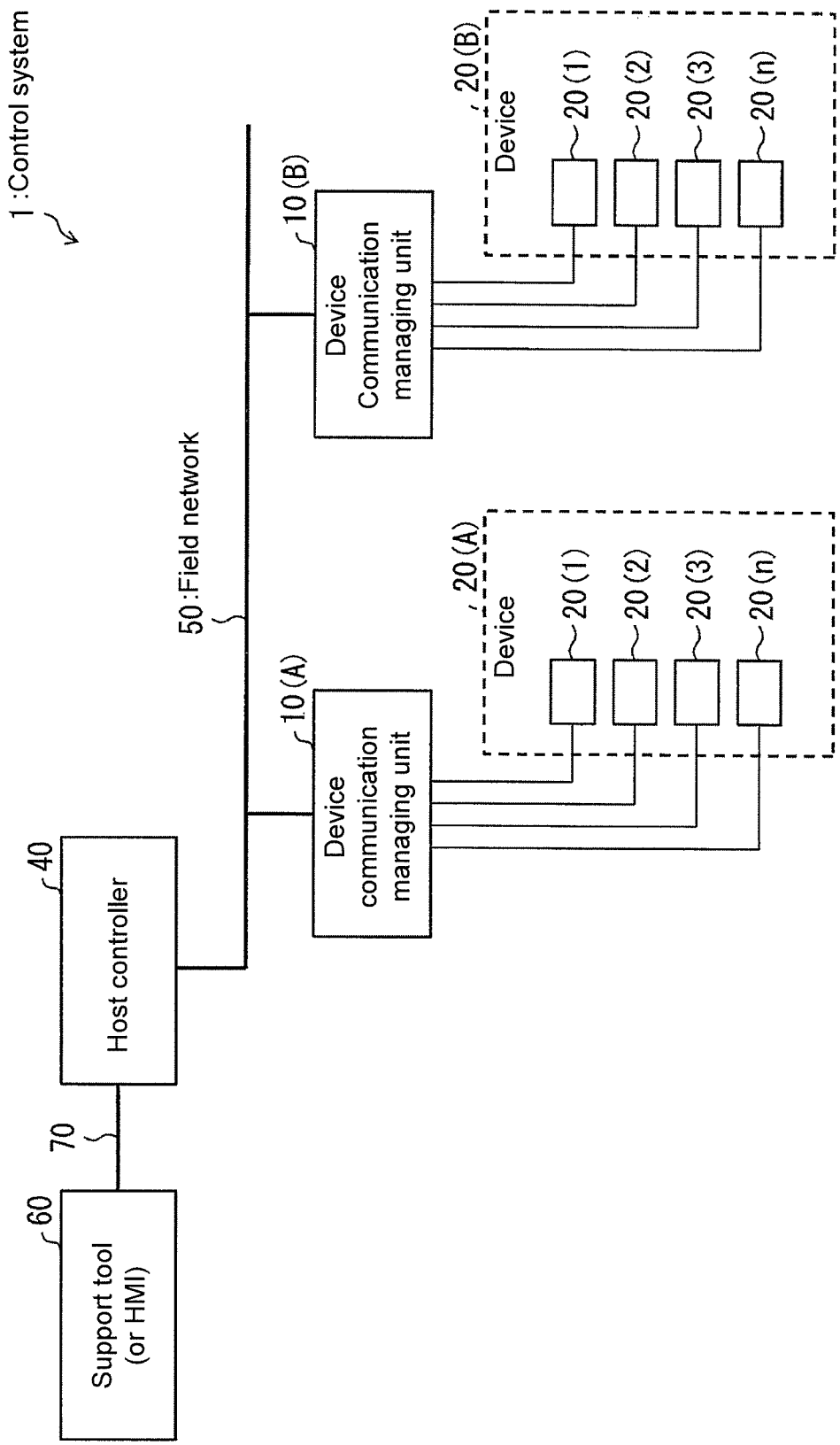
FIG. 2 is a diagram illustrating an integral generalization of a control system 1 of the present embodiment.

FIG. 2 is a diagram representing an outline of a control system 1 including the device communication managing unit 10. As shown in FIG. 2, the control system 1 comprises a host controller 40 and one or more device communication managing units 10 connected to the host controller 40 through a field network 50 (host bus, i.e., a host communication network). In the example in FIG. 2, the device communication managing unit 10(A) and the device communication managing unit 10(B) are connected to the host controller 40 by the field network 50. In addition, in the following explanation, under the condition that each of the device communication managing unit 10(A) and the device communication managing unit 10(B) does not need to be distinguished particularly, they are simply referred to as "device communication managing unit 10".

The control system 1 is a master-slave control system which includes a controller 40 as the master device and one or more device communication managing units 10 as the slave devices connected to the master device through the network (field network 50). The meaning that the host controller 40 manages the data transmitted by the field network 50 is called as "master device" and in another aspect, the device communication managing unit 10 is referred to as "slave device".

In the control system 1, the device communication managing unit 10 is connected to one or more devices 20 through a device communication cable 30. In the example shown in FIG. 2, the devices 20(1), 20(2), 20(3), . . . , 20(n) are connected to the device communication managing unit 10 by the device communication cable 30. In addition, under the condition that each of the devices 20(1), 20(2), 20(3), . . . , 20(n) does not need to be distinguished particularly, they are simply referred to as "device 20".

The host controller 40 is, for example, a Programmable Logic Controller (PLC) and is a master device for managing the data transmission through the field network 50 in the control system 1. The slave devices connected to the host controller 40 serving as the master device, except for the device communication managing unit 10, can also contain a servo driver (not shown) directly connected to the field network 50. Further, under the condition that a plurality of host controllers 40 are connected to the field network 50, there is a condition that any host controller 40 serves as the master device, and the rest of host controllers serve as the slave devices. Further, or a control main body different from both the host controller 40 and the device communication managing unit 10 serves as the master device. That is, the "master device" and "slave device" are defined based on a data transmission control function on the field network 50, and what information received and transmitted among the respective devices is not particularly limited.

The host control 40 performs the overall control of the control system 1. Specifically, the host controller 40 acquires information from the device 20 that is an input machine such as a sensor, and uses the acquired information as input data for executing operation processing according to a preinstalled user program. In addition, the host controller executes the operation processing, decides a control content for the device 20 that is an output machine such as an actuator, and outputs control data corresponding to the control content to the device 20.

The field network 50 transmits various types of data received or transmitted by the host controller 40, for example, EtherCAT®, PROFINET®, MECHATROLINK®-III, Powerlink®, SERCOS®-III, and CIP (Motion). Besides, the field network 50 for example can be EtherNet/IP®, DeviceNet, CompoNet®, etc. In addition, hereinafter, by sequentially transferring data frames on the field network 50, the control system 1 receiving and transmitting data between the host controller 40 and the device communication managing unit 10 or between the device communication managing unit 10(A) and the device communication managing unit 10(B) is explained. Besides, in the following explanation, in order to compare the filed network 50 with communication through the device communication cable 30 serving as a lower communication network, the field network 50 is sometimes called as "host bus (host communication network)". Further, in order to distinguish the field network 50 from the data frames transmitted on the device communication cable 30, the data frame on the field network 50 is also called as "host data frame".

Besides, as shown in FIG. 2, the host controller 40 is connected to a support tool 60 through a communication cable 70 such as a USB (Universal Serial Bus) cable.

The support tool 60 is an information processing device used for setting various parameters for the control system 1. For example, the timing of acquiring a state value (input refreshing) and updating an output value (output refreshing) can be calculated and set by the support tool 60. The support tool 60 typically includes a general-purpose computer. For example, the information processing program executed by the support tool 60 can also be stored and distributed in a CD-ROM (Compact Disk-Read Only Memory) (not shown). The program stored in the CD-ROM is read by a CD-ROM driving device (not shown), and stored in a hard disk of the support tool 60. Or, the program can be downloaded from a higher-level host computer through the network.

The support tool 60 can also be replaced, and a Human Machine Interface (HMI) is connected to the host controller 40 by a communication cable 70. The HMI is a part for human-machine information exchange, and is, specifically, a part through which a human being operates the machine (gives instructions to the machine), or a part through which the machine informs the human being of a current state/result. The HMI serving as the part through which the human being gives instructions to the machine includes a switch, a button, a handle, a dial, a pedal, a remote controller, a microphone, a keyboard, a mouse, etc., and the HMI serving as a part through which the machine transmits the current state/result and other related information to the human being includes a LCD screen, a meter, a lamp, a speaker, etc.

The device communication managing unit 10 is a slave device connected to the host controller 40 serving as the master device through a network (field network 50) in the control system 1 as the master-slave control system.

That is, the device communication managing unit 10 controls the communication between the host controller 40 (field network 50) and the device 20, For example, the device communication managing unit 10 transmits sensing information detected by the device 20 which is an input machine such as a sensor connected to the device communication managing unit 10 to the host controller 40 through the field network 50. Besides, the host controller 40 executes the user program based on the acquired sensing information and transmits an execution result as a control command signal to the device communication managing unit 10 through the field network 50. The device communication managing unit 10 outputs a control command received through the field network 50 to the actuated output machine (the device 20 such as the actuator).

The device communication managing unit 10 has a host communication port 120, which is connected to a transmission cable configured to communicate with the host controller 40 through a field network 50. Besides, the device communication managing unit 10 is connected to a device communication cable 30 configured to communicate with each of the one or more devices 20, and has one or more device communication ports 110(1), 110(2) . . . 110(n). In addition, in the following illustration, under the condition that each of the device communication ports 110(1), 110(2) . . . 110(n) does not need to be particularly distinguished, they are simply referred to as "device communication port 110".

The device communication managing unit 10 carries out the processing related to data transmission in the field network 50, and controls the data transceiving (input/output) of the device 20. Particularly, the device communication managing unit 10 carries out the data transceiving (input/output) by using any of the two following communication modes according to a variety of the device 20 connected to each of the device communication port 110(1), 110(2) . . . 110(n) through the device communication cable 30.

That is, the device communication managing unit 10 communicates with the device 20(S) in "a first mode that only transceives 1-bit data" under the condition that the device 20 connected to the device communication port 110 is a conventional standard device, i.e., device 20(S). Besides, the device communication managing unit 10 communicates with the device 20(S) in "a second mode that transceives more than 1 bit of data" under the condition that the device 20 connected to the device communication port 110 is an intelligent (specifically, capable of communication) device 20(C).

When communicating in the first mode, the device communication managing unit 10 only transceives (input/output) binary data with the device 20(S). Specifically, the device communication managing unit 10 can collect (receive) the information such as a device 20(S) as the sensor detecting (switched on) objects or not detecting (switched off) objects. That is, the device communication managing unit 10 receives 1 bit output data from the device 20(S). Besides, the device communication managing unit 10 can output (transmit) a command activating (switching on) or deactivating (switching off) the device 20(S) as a predetermined output object (for example, the actuator). That is, the device communication managing unit 10 transmits 1 bit input data to the device 20(S).

When communicating in the second mode, the device communication managing unit 10 can also transceive (input/output) analog data except for the aforesaid binary data (1-bit data). The device communication managing unit 10 communicates in the second mode, and can thus acquire communication property, device parameters, and recognition data (recognition information), etc., of the device 20(C) serving as the analog data.

The device 20 is, for example, an input machine such as a sensor or an output machine such as an actuator. The actuator converts the input into physical movement, and actively operates or drives.

In the control system 1, the device 20 is a conventional standard device, i.e., device 20(S) or an intelligent (specifically, capable of communication with the device communication managing unit 10) device, i.e., device 20(C). The device 20(S) communicates with the device communication managing unit 10 in the first mode of "only transceiving 1-bit data". The device 20(C) communicates with the device communication managing unit 10 in the second mode of "transceiving more than 1 bit of data".

(As for the Device Communication Managing Unit)

As so far, the outline of the control system 1 and the devices (the device communication managing unit 10, the device 20, the host controller 40 and the support tool 60) included in the control system 1 are illustrated by using FIG. 2. Next, for the device communication managing unit 10 included in the control system 1, the configuration thereof, the content being processed thereby and the like are explained by using FIG. 1. Before describing the details of the device communication managing unit 10 with reference to FIG. 1, in order to facilitate understanding of the device communication managing unit 10, the outline of the device communication managing unit 10 is organized as follows.

(Outline of the Device Communication Managing Unit)

The device communication managing unit 10 (slave device) is connected to a host controller 40 (controller) as the master device through a field network 50 (network), and has a device communication port 110 (communication port) connected to the device (20), and the slave device comprises: a mode setting part 104 for setting the device 20 connected to the device communication pot 110 to communicate in a first mode or a second mode, wherein the first mode is a mode of only receiving 1-bit data and the second mode is a mode of receiving more than 1 bit of data; and an output data generating part 105 (transmitting part) for transmitting the data received from the device 20 communicating in the first mode to the field network 50 (through a host communication control part 130) in a following data format when the mode setting part 104 sets the first mode, wherein the data format is used for transmitting the data received from the device 20 to the field network 50 when the mode setting part 104 sets the second mode.

According to the configuration, the output data generating part 105 transmits the data acquired from the device 20 to the field network 50 through the host communication control part 130 when the first mode is set by using the data format for transmitting the data acquired from the device 20 to the field network 50 (through the host communication control part 130) when the mode setting part 104 sets the second mode. That is, the device communication managing unit 10 transmits the data acquired from the device to the field network 50 by using the data format no matter communicating with the device 20 in the first mode or the second mode.

Herein, under the condition that the data format used for transmission to the field network 50 is different according to the fact that the communication with the device 20 is carried out in the first mode or the second mode, the host controller 40 must acquire the following information. That is, the host controller 40 must acquire information related to whether the data received by the host controller 40 from the device 20 is the data received by the device communication managing unit 10 from the device 20 in the first mode or the data received by the device communication managing unit 10 from the device 20 in the second mode. Besides, the host controller 40 must acquire the information related to how the data received by the device communication managing unit 10 from the device 20 in the first mode is stored to the data format corresponding to the first mode, and how the data received by the device communication managing unit 10 from the device 20 in the second mode is stored to the data format corresponding to the second mode.

In another aspect, the device communication managing unit 10 transmits the data received from the device 20 to the field network 50 by using the data format no matter communicating with the device 20 in the first mode or the second mode.

Therefore, the device communication managing unit 10 achieves the effects that the data format used for transmitting the data received from the device 20 to the field network 50 can be simplified, and the processing in the device communication managing unit 10 and the host controller 40 can also be simplified.

Besides, the device communication managing unit 10 transmits the data received from the device 20 to the field network 50 using the shared data format no matter communicating with the device 20 in the first mode or the second mode, and thus achieves the effects that the device 20 connected to the device communication managing unit 10 can be easily replaced without changing the reception processing or the like in the host controller 40.

(Details of the Device Communication Managing Unit)

Regarding the device communication managing unit 10 outlined above, the configuration of the device communication managing unit 10 is described in detail with reference to FIG. 1.

FIG. 1 is a block diagram illustrating a configuration of a main part of a device communication managing unit 10. The device communication managing unit 10 shown in FIG. 1 includes a device communication control part 100, a device communication port 110, a host communication port 120, a host communication control part 130 and a storage part 140. In addition, in order to ensure simplicity of the description, configurations not directly related to the present embodiment are omitted from the description and the block diagram. But, based on the actual circumstances of implementation, the device communication managing unit 10 can comprise the omitted configuration.

The device communication port 110 is an interface to which a transmission cable for communicating with the device 20 through the device communication cable 30 is connected. The host communication port 120 is an interface to which a transmission cable for communicating with the host controller 40 through the field network 50 is connected.

The host communication control part 130 uniformly controls the communication with the host controller 40 through the field network 50. The host communication control part 130 includes a field bus control part 131, a host communication reception processing part 132 and a host communication transmission processing part 133.

The field bus control part 131 manages the data transmission through the field network 50. The host communication reception processing part 132 receives a host communication frame transmitted from the host controller 40 through the field network 50, decodes it into data, and then outputs it to the field bus control part 131. The host communication transmission processing part 133 regenerates the host communication frame according to the data output from the field bus control part 131 and retransmits (forwards) it through the field network 50. The field bus control part 131 cooperates with the host communication reception processing part 132 and the host communication transmission processing part 133, and transceives data with the host controller 40 through the field network 50 at each predetermined control period.

The host communication control part 130 transmits an IO map representing how the device 20 (for example, the data corresponding to the data output from the device 20) is allocated to a memory space and an I/O space to the host controller 40 (field network 50). The IO map which can be allocated to the host control 40 by the device communication managing unit 10 is described later in detail.

The device communication control part 100 uniformly controls the function of the device communication managing unit 10 related to the communication of the device 20. The illustrated device communication control part 100 includes, as function blocks, a device communication processing part 101, a device communication reception processing part 102, a device communication transmission processing part 103, a mode setting part 104, an output data generating part 105 and a comparing part 106.

The device communication control part 101 controls the communication with the device 20 and includes a device communication reception processing part 102 and a device communication transmission processing part 103. The device communication processing part 101 can execute the following four functions.

First, the device communication processing part 101 receives a mode setting instruction (information for instructing communication with the device 20 in the first mode or the second mode) from the mode setting part 104, and carries out the communication with the device 20 in a communication mode designated by the mode setting instruction.

Second, when the mode setting part 104 invalidates or cancels a comparing function of certain device communication port 110, the device communication processing part 101 actuates the certain device communication port 110 as a communication port communicating in a first mode (specifically, the communication port that can only receive and transmit 1-bit data (digital data)). When the mode setting part 104 validates the comparing function of certain device communication port 110, the device communication processing part 101 actuates the certain device communication port 110 as a communication port communicating in a second mode (specifically, the communication port that can receive and transmit "1-bit data (digital data)" and "analog data").

Third, the device communication processing part 101 acquires a comparing result in each of the device communication port 110(1), 110(2) . . . 110(n) from the comparing part 106. When acquiring the comparing result "the device 20 predetermined to be connected (registered device) and the device 20 actually connected (actual device) are consistent (normal comparing)" about certain device communication port 110 from the comparing part 106, the device communication processing part 101 keeps the communication in the certain device communication port 110. When acquiring the comparing result "the device 20 predetermined to be connected (registered device) and the device 20 actually connected (actual device) are inconsistent (abnormal)" about certain device communication port 110 from the comparing part 106, the device communication processing part 101 stops the communication in the certain device communication port 110. In addition, when the comparison processing of the comparing part 106 is not executed for certain device communication port 110, the device communication processing part 101 keeps the communication in the certain device communication port 110.

In addition, the so-called "device 20 predetermined to be connected" is referred to as the device 20 registered as the device connected to each of the device communication ports 110(1), 110(2) . . . 110(n). That is, for each of the device communication ports 110(1), 110(2) . . . 110(n), the device 20 (registered device) that should be connected has been pre-registered as, for example, configuration information (configuration data). That is, the so-called "device 20 predetermined to be connected" is referred to as the device 20 predetermined as the device connected to the device communication port 110 and registered in the device communication managing unit 10 as the device connected to the device communication port 110. For example, the recognition information of the "device 20 predetermined to be connected (registered device)" serves as the configuration information (configuration data), and stored (registered) in a configuration set information table 141.

Fourth, when the device 20 is connected to the device communication port 110, the device communication processing part 101 transmits a signal (for example, WURQ) inquiring that the self device (device 20) is a conventional standard device, i.e., device 20(S) or an intelligent device, i.e., device 20(C) to the connected device 20. Besides, the device 20 receiving the signal (WURQ) receives a signal representing an answer specific to that the self device (device 20) is the device 20(S) or the device 20(C). The device communication processing device 101 can recognize that the device 20 connected to the device communication port 110 is the device 20(S) or the device 20(C) by receiving the signal representing the answer. The device communication processing part 101 transmits a recognition result that the device 20 connected to the device communication port 110 is the device 20(S) or the device 20(C) to the mode setting part 104, etc.

The device communication processing part 101, for example, can judge that the device 20 connected to the device communication port 110 is the device 20(S) or the device 20(C) according to the fact that whether the signal representing the answer specific to the signal (WURQ) is received or not.

That is, under the condition that the device 20 (the device 20 connected to the device communication port 110) receiving the signal (WURQ) is the device 20(C), the device 20 transmits the signal representing that "the self device (device 20) is the intelligent device, i.e., the device 20(C)" (the signal representing the answer of the inquiring) to the device communication processing part 101. Under the condition that the device 20 receiving the signal (WURQ) is the device 20(C), the device communication processing part 101 receives the signal representing the answer specific to the inquiring (the signal representing that "the self device (device 20) is the intelligent device, i.e., the device 20(C)") from the device 20 (to be more accurate, the device 20(C)) connected to the device communication port 110. The device communication processing part 101 can judge that the device 20 connected to the device communication port 110 is the device 20(C) by receiving the signal representing the answer.

In another aspect, under the condition that the device 20 (the device 20 connected to the device communication port 110) receiving the signal (WURQ) is the device 20(S), the device 20 does not transmit the signal representing the answer specific to the signal (WURQ) to the device communication processing part 101. The device communication processing part 101 receives no signal representing the answer specific to the signal (WURQ) from the device 20 connected to the device communication port 110, and thus judges that "the device 20 connected to the device communication port 110 is the device 20(S)".

In addition, as mentioned later, no matter the device 20 connected to the device communication port 110 is the device 20(S) or the device 20(C), the mode setting part 104 will instruct the output data generating part 105 not to switch the IO map allocated to the host controller 40. That is, the device communication managing unit 10 does not switch the IO map under the condition of the comparing function: cancellation (the first mode) and the comparing function: validation (the second mode).

Therefore, the configuration that the device communication processing part 101 can judge that the device connected to the device communication port 110 is the device 20(S) or the device 20(C) is not essential for the device communication managing unit 10. Besides, the method that the device communication processing part 101 judges that the device connected to the device communication port 110 is the device 20(S) or the device 20(C) is not limited to the method mentioned above. The device communication processing part 101 can judge the device is the device 20(S) or the device 20(C) by using the conventional method for judging the device 20 connected to the device communication port 110 is the device 20(S) or the device 20(C).

The device communication reception processing part 102 receives the output data of the devices 20(1), 20(2) . . . 20(n) connected to each of the device communication ports 110(1), 110(2) . . . 110(n) through the device communication cable 30 from each of the device communication ports 110(1), 110(2) . . . 110(n).

When the device 20 is the device 20(S), the output data from the device 20 is 1-bit data (for example, the binary data such as switching on/off information indicating that the device 20 as a sensor detects (switches on) or does not detect (switches off) certain object). The device communication reception processing part 102 only receives the 1-bit data when communicating with the device 20(S) in the first mode.

When the device 20 is the device 20(C), the output data from the device 20 also includes analog data related to the communication property, device parameters and recognition data (recognition information) of the device in addition to the 1-bit data (for example, the binary data such as switching on/off information indicating that the device 20 as a sensor detects (switches on) or does not detect (switches off) certain object). The device communication reception processing part 102 receives the 1-bit data and the analog data when communicating with the device 20(C) in the second mode. The analog data received when the device communication reception processing part 102 communicates with the device 20(C) in the second mode includes the recognition information of the device 20(C).

The device communication transmission processing part 103 transmits the input data such as a control command from the host controller 40 to the devices 20(1), 20(2) . . . 20(n) connected to each of the device communication ports 110(1), 110(2) . . . 110(n) through the device communication cable 30 from each of the device communication ports 110(1), 110(2) . . . 110(n).

When the device 20 is the device 20(S), the input data to the device 20 is 1-bit data (for example, the command data for activating (switching on) or deactivating (switching off) the device 20 as an actuator). The device communication transmission processing part 103 only transmits the 1-bit data when communicating with the device 20(S) in the first mode.

When the device 20 is the device 20(C), the input data to the device 20 also includes analog data related to other control specific to the device 20 in addition to the 1-bit data (for example, the command data for activating (switching on) or deactivating (switching off) the device 20 as an actuator). The device communication transmission processing part 103 transmits the 1-bit data and the analog data when communicating with the device 20(C) in the second mode.

The mode setting part 104 executes the following three functions (a), (b) and (c).

Function (a): the mode generating part 104 generates a mode setting instruction, the mode setting instruction instructs the fact that each of the devices 20(1), 20(2) . . . 20(n) communicates in the first mode or the second mode to the device communication processing part 101, and the devices 20(1), 20(2) . . . 20(n) are connected to each of the device communication ports 110(1), 110(2) . . . 110(n). The mode setting part 104 outputs the generated mode setting instruction to the communication processing part 101.

That is, the mode setting part 104 instructs the communication of each of the devices 20(1), 20(2) . . . 20(n) to the device communication processing part 101, and the devices 20(1), 20(2) . . . 20(n) are connected to each of the device communication ports 110(1), 110(2) . . . 110(n).

Herein, the mode setting part 104 can determine that each of the devices 20(1), 20(2) . . . 20(n) communicates in the first mode or the second mode in the following manner.

First, the mode setting part 104 determines that each of the devices 20(1), 20(2) . . . 20(n) communicates in the first mode or the second mode by referring to a configuration setting information table 141 stored in the storage part 140. That is, the mode setting mode 104 acquires the information related to the following content by referring to the configuration setting information table 141, that is, each of the devices 20(1), 20(2) . . . 20(n) connected to each of the device communication ports 110(1), 110(2) . . . 110(n) communicates in the first mode or the second mode. Besides, the mode setting part 104 can generate a mode setting instruction indicating that each of the devices 20(1), 20(2) . . . 20(n) communicates in the first mode or the second mode to each of the device communication ports 110(1), 110(2) . . . 110(n) by using the acquired information.

Second, the mode setting part 104 can receive an instruction corresponding to a user operation accepted by the support tool 60 connected to the host controller 40 by the communication cable 70 through the field network 50, and generates a mode setting instruction indicating that communication is carried out in the first mode or the second mode to each of the device communication ports 110(1), 110(2) . . . 110(n) based on the instruction.

Third, the mode setting part 104 can acquire the following information from the device communication reception processing part 102, and thus generates a mode setting instruction indicating that each of the devices 20(1), 20(2) . . . 20(n) communicates in the first mode or the second mode, in which the devices 20(1), 20(2) . . . 20(n) are connected to each of the device communication ports 110(1), 110(2) . . . 110(n). That is, the mode judging part 104 acquires judging information related to the following content from the device communication reception processing part 102, that is, each of the devices 20(1), 20(2) . . . 20(n) connected to each of the device communication ports 110(1), 110(2) . . . 110(n) is the device 20(S) or the device 20(C). Besides, the mode generating part 104 generates a mode setting instruction indicating a certain device communication port 110 to communicate in the first mode when the device 20 connected to the certain device communication port 110 is the device 20(S). The mode generating part 104 generates a mode setting instruction indicating a certain device communication port 110 to communicate in the second mode when the device 20 connected to the certain device communication port 110 is the device 20(C).

Function (b): the mode setting part 104 also instructs the validation/invalidation/cancellation of the comparing function in each of the device communication ports 110(1), 110(2) . . . 110(n) to the comparing part 106. For example, the mode setting part 104 instructs the validation/invalidation of the comparing function in a certain device communication port 110 to the comparing part 106 when acquiring an instruction about the validation/invalidation of the comparing function in the certain device communication port 110 from the support tool 60.

The mode setting part 104 instructs the cancellation of the comparing function in a certain device communication port 110 to the comparing part 106 when receiving a notification indicating that the device 20 connected to the certain device communication port 110 is the device 20(S) from the device communication reception processing part 102. Besides, the mode setting part 104 instructs the validation of the comparing function in a certain device communication port 110 to the comparing part 106 when receiving a notification indicating that the device 20 connected to the certain device communication port 110 is the device 20(C) from the device communication reception processing part 102.

That is, the mode setting part 104 instructs the validation/invalidation/cancellation of the comparing function in each of the device communication ports 110(1), 110(2) . . . 110(n) to the comparing part 106.

Function (c): the mode setting part 104 further notifies the output data generating part 105 of the validation/invalidation/cancellation of the comparing function in each of the device communication ports 110(1), 110(2) . . . 110(n). For example, the mode setting part 104 notifies the output data generating part 105 of the validation/invalidation/cancellation of the comparing function in certain device communication port 110 when acquiring an instruction about the validation/invalidation of the comparing function in the certain device communication port 110 from the support tool 60.

The mode setting part 104 notifies the output data generating part 105 of the cancellation of the comparing function in a certain device communication port 110 when receiving a notification indicating that the device 20 connected to the certain communication port 110 is the device 20(S) from the device communication reception processing part 102. Besides, the mode setting part 104 notifies the output data generating part 105 of the validation of the comparing function in a certain device communication port 110 when receiving a notification indicating that the device 20 connected to the certain communication port 110 is the device 20(C) from the device communication reception processing part 102.

That is, the mode setting part 104 notifies the output data generating part 105 of the validation/invalidation/cancellation of the comparing function in each of the device communication ports 110(1), 110(2) . . . 110(n).

As organized above, the mode setting part 104 instructs the communication mode (first mode or second mode) and the validation/invalidation/cancellation of the comparing function to each of the device communication ports 110(1), 110(2) . . . 110(n). For example, the mode setting part 104 can set the comparing function in each of the device communication ports 110(1), 110(2) . . . 110(n) to be validated and set the comparing function of the device communication ports 110(2) to be cancelled.

The output data generating part 105 stores the output data from the devices 20(1), 20(2) . . . 20(n) to a predetermined position of the predetermined data format, and generates the data transmitted to the host controller 40 (field network 50).

The output data generating part 105 generates the data transmitted to the host controller 40 (field network 50) based on the validation/invalidation/cancellation of the comparing function notified from the mode setting part 104.

The output data generating part 105 generates the data to be transmitted to the host controller 40 (field network 50) according to the data acquired through the certain device communication port 110 by using the same data format particularly under the condition that the notification indicating that the comparing function in a certain device communication port 110 is validated is received from the mode setting part 104 and under the condition that the notification indicating that the comparing function in a certain device communication port 110 is cancelled is received from the mode setting part 104.

That is, the output data generating part 105 transmits the "data received from the device 20 communicating in the first mode" to the field network 50 (through host communication control part 130) by using "the data format used for transmitting the data received from the device 20 to the field network 50 when the mode setting part 104 sets the second mode" when the mode setting part 104 instructs "the cancellation of the comparing function".

"The data format used for transmitting the data received from the device 20 to the field network 50 when the second mode is set" used by the output data generating part 105 is same as "the data format for transmitting the data received from the device 20 to the field network 50" used by the output data generating part 105 when the mode setting part 104 instructs the "cancellation of the comparing function". The details of the data generated by the output data generating part 105 is described with reference to FIG. 6 and FIGS. 8(B-1) to 8(B-4).

The comparing part 106 executes the comparison processing of judging whether the device 20 predetermined to be connected (registered device) and the device 20 actually connected (actual device) are consistent for each of the device communication ports 110(1), 110(2) . . . 110(n).

The comparing part 106, for example, acquires the recognition information of the device 20 predetermined to be connected (registered device) for each of the device communication ports 110(1), 110(2) . . . 110(n) by referring to a configuration setting information table 141 stored in the storage part 140. Besides, the comparing part 106 acquires the recognition information of the device 20 (particularly the device 20(C)) actually connected to each of the device communication ports 110(1), 110(2) . . . 110(n) from the device communication reception processing part 102. As mentioned above, the analog data received by the device communication reception processing part 102 when communicating with the device 20(C) in the second mode includes the recognition information of the device 20(C). Besides, the comparing part 106 executes the comparison processing of judging whether the recognition information of the device 20 predetermined to be connected (registered device) and the recognition information of the device 20 actually connected (particularly the device 20(C)) are consistent for each of the device communication ports 110(1), 110(2) . . . 110(n).

The comparing part 106 executes or does not execute the comparison processing based on the instruction of the validation/invalidation/cancellation of the comparing function from the mode setting part 104. Specifically, the comparing part 106 executes the comparison processing when acquiring the instruction that the comparing function is validated from the mode setting part 104. The comparing part 106 does not execute the comparison processing when acquiring the instruction that the comparing function is invalidated or cancelled from the mode setting part 104.

The comparing part 106 notifies the device communication processing part 101 of a comparing result (normal/abnormal) under the condition of executing the comparison processing on each of the device communication ports 110(1), 110(2) . . . 110(n).

The storage part 140 stores various data used by the device communication managing unit 10. That is, the storage part 140 stores (1) a control program, (2) an Operating System (OS) program, and (3) application programs for executing various functions to be executed by the device communication managing unit 10, and (4) various data read when the application programs are executed. The data of (1) to (4) for example are stored in a Read Only Memory (ROM), a flash memory, an Erasable Programmable Read Only Memory (EPROM), an Electrically Erasable Programmable Read Only Memory (EEPROM®), a Hard Disc Drive (HDD) and other nonvolatile storage devices. Besides, the storage part 140 stores a configuration setting information table 141.

The configuration setting information table 141 stores configuration information (configuration data) including the recognition information of the device 20 (particularly the device 20(C)) predetermined to be connected by the device communication cable 30 for each of the device communication ports 110(1), 110(2) . . . 110(n). The recognition information of the device 20 (particularly the device 20(C)) is, for example, a "vendor ID", a "device ID", a "serial number" and a "revision (for example, an IO-Link revision)" of the device 20 (particularly the device 20(C)).

(Judging Processing Related to a Communication Mode of the Device)

When a certain device communication port 110 is set into a first mode by the mode setting part 104, the device communication processing part 101 communicates with the device 20 connected to the certain device communication port 110 in the first mode. When a certain device communication port 110 is set into a second mode by the mode setting part 104, the device communication processing part 101 communicates with the device 20 connected to the certain device communication port 110 in the second mode.

Herein, when communication of the second mode begins, the device communication managing unit 10 (device communication processing part 101) must first judge that the device 20 connected to the device communication port 110 is a conventional standard device, i.e., device 20(S) or an intelligent device, i.e., 20(C). That is, the device communication processing part 101 first judges the device 20 connected to the device communication port 110 is the device 20(S) only capable of communicating in the first mode or the device 20(C) capable of communicating in the second mode.

The device communication processing part 101, for example, judges the device 20 connected to the device communication port 110 is the device 20(S) capable of only communicating in the first mode or the device 20(C) capable of communicating in the second mode through the following method. That is, the device communication processing part 101 outputs a signal (for example, the Wake-up request (WURQ) of a current pulse of 80 μs and 0.5 A): requesting to answer the information that "the self device is the device 20(S) or the device 20(C)" to the device 20 connected to the device communication port 110. Then, the device 20 receiving the signal (WURQ) transmits the signal representing that "the device is the device 20(C)" to the device communication managing unit 10 when the self device is 20(C). In addition, when the self device is the device 20(C), the device 20 receiving the signal (WURQ) can also perform signal transmission for notifying the device communication managing unit 10 of the maximum communication rate of the self device communicating with the device communication managing unit 10 in the second mode.

The device communication processing part 101 judges that "the device 20 connected to the device communication port 110 is the device 20(C)" when receiving a signal representing that the "self device is the device 20(C)" from the device 20. Besides, the device communication processing part 101 can recognize the maximum transmission rate supported by the device 20 as the device 20(C) when receiving "the maximum communication rate of the self device (device 20) communicating with the device communication managing unit 10 in the second mode" from the device 20.

(Device Comparison Processing)

When the device 20(C) is connected to the device communication port 110 through the device communication cable 30, the comparing part 106 executes the comparison processing. Besides, when the comparing part 106 judges "abnormal" (the device 20 (actual device) actually connected to the device communication port 110 and the device 20 (registered device) predetermined to be connected to the device communication port 110 are inconsistent), the device communication processing part 101 stops the communication in the device communication port 110.

Herein, the comparing part 106 compares the "vendor ID", "device ID" and "provision" of the device 20 (actual device) actually connected to the device communication port 110 and the "vendor ID", "device ID" and "version" of the device 20 (registered device) predetermined to be connected to the device communication port 110 (first comparing pattern).

Besides, the comparing part 106 may also compare the "vendor ID", "device ID", "provision" and "serial number" of the device 20 (actual device) actually connected to the device communication port 110 and "vendor ID", "device ID", "version" and "serial number" of the device 20 (registered device) predetermined to be connected to the device communication port 110 (second comparing pattern).

Herein, as mentioned above, the comparing part 106 executes comparison processing on each of the device communication ports 110(1), 110(2) . . . 110(n). For example, the comparing part 106 compares the "vendor ID", "device ID" and "provision" of the device 20 (actual device) actually connected to the device communication port 110(1) and the "vendor ID", "device ID" and "version" of the device 20 (registered device) predetermined to be connected to the device communication port 110(1). Besides, the comparing part 106 compares the "vendor ID", "device ID" and "provision" of the device 20 (actual device) actually connected to the device communication port 110(2) and the "vendor ID", "device ID" and "version" of the device 20 (registered device) predetermined to be connected to the device communication port 110(2). The comparing part 106 can also perform comparison processing on the device communication ports 110(1), 110(3), 110(4), . . . 110(n) but does not perform comparison processing on the device communication port 110(2).

In addition, when the comparison processing is performed in the first pattern, the "serial number" is not used as the object to be compared, and therefore even if the device 20 having a same form as the registered device (i.e., the "vendor ID, "device ID" and "provision" are same as those of the registered device) is connected to the device communication port 110, and the comparing part 106 does not judge as abnormal.

As organized above, the device communication managing unit 10 has a storage part 140 (particularly, the configuration setting information table 141) that stores the configuration information including the recognition information of the device 20 (registered device) predetermined to be connected to the device communication port 110. Besides, the device communication managing unit 10 has a comparing part 106 that executes the comparison processing when the mode setting part 104 sets the second mode and executes no comparison processing when the mode setting part 104 sets the first mode, in which the comparison processing is to judge consistency between the recognition information of the device 20 included in the more than 1 bit of data received from the device 20 (recognition information of the actual device) and the recognition information included in the configuration information stored by the storage part 140 (the recognition information of the registered device).

According to the configuration, the comparing part 106 executes the comparison processing when the mode setting part 104 sets the second mode, and executes no comparison processing when the mode setting part 104 sets the first mode, and the comparison processing is to judge consistency between the recognition information of the device 20 included in the more than 1 bit of data received from the device 20 and the recognition information included in the configuration information stored by the storage part 140. That is, the device communication managing unit 10 confirms whether the device 20 (actual device) connected to the device communication port 110 is consistent with the device 20 (registered device) predetermined to be connected to the device communication port 110 when the mode setting part 104 sets the second mode, and does not confirm whether the device 20 connected to the device communication port 110 is consistent with the device 20 predetermined to be connected to the device communication port 110 when the mode setting part 104 sets the first mode.

For example, when the device predetermined to be connected to the device communication port 110 in the second mode is replaced with the device connected to the device communication port 110 in the first mode, the device communication managing unit 10 executes no comparison processing on the device 20 that communicates with the device communication port 110 in the first mode.

Therefore, the following effects can be achieved, that is, a user can easily replace the device predetermined to be connected to the device communication port 110 in the second mode with the device connected to the device communication port 110 in the first mode by using the device communication managing unit 10.

(Conventional Device Communication Managing Unit)

In order to facilitate understanding of the device communication managing unit 10, a conventional device communication managing unit 9 capable of communicating with the device 20 in the first or second mode like the device communication managing unit 10 is described with reference to FIGS. 3 to 5(A) and FIGS. 5(B-1) to (B-4). In addition, the conventional device communication managing unit 9 is same as the device communication managing unit 10 except for the setting of cancelling the comparing function that can be realized in the device communication managing unit 10. Therefore, the detailed content of the conventional device communication managing unit 9 is briefly described, and the difference from the device communication managing unit 10 is focused below.

(Replacement of a Connecting Device)

The difference between the device communication managing unit 10 and the conventional device communication managing unit 9 is particular clear when the connected device 20 is replaced. Therefore, FIG. 3 is used first, hereinafter, and for the conventional device communication managing unit 9, the condition of replacing the device 20 connected to the device communication port 110 (for example, the device communication port 110(2)) is described.

Figure 3:
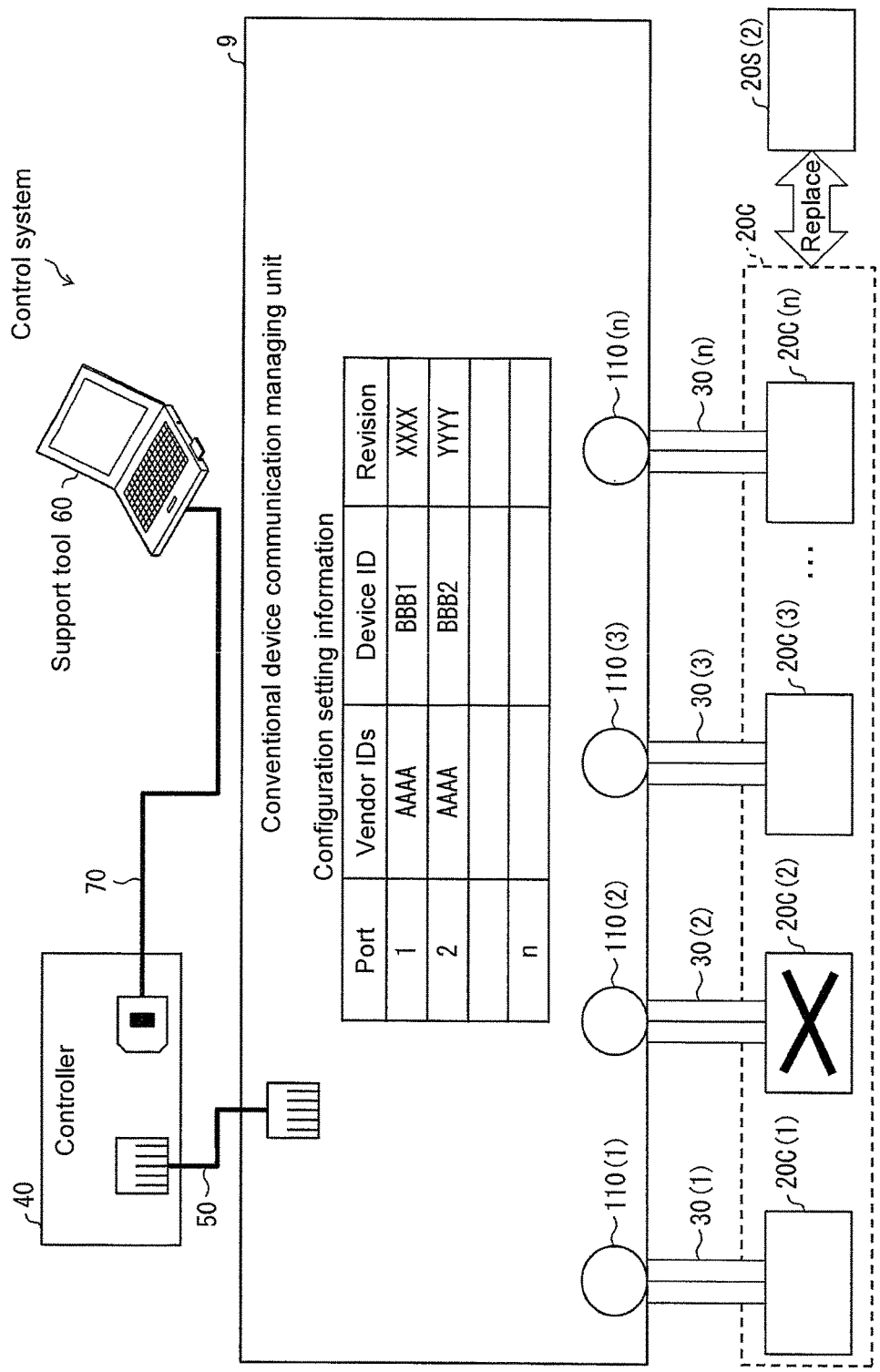
FIG. 3 is a diagram illustrating the replacement of a device connected to a device communication port of the device communication managing unit in the control system 1.

FIG. 3 is a diagram representing a condition of replacing the device 20(C2) connected to a certain device communication port 110 (for example, the device communication port 110(2)) of the conventional device communication managing unit 9 with the device 20(S1).

Similar to the device communication managing unit 10, the conventional device communication managing unit 9 executes the comparison processing on the device 20 connected to the device communication port 110(2). Besides, when "abnormal (the device 20 (actual device) actually connected to the device communication port 110(2) and the device 20 (registered device) predetermined to be connected to the device communication port 110(2) are inconsistent)" is judged, the conventional device communication managing unit 9 stops the communication in the device communication port 110(2).

For example, when the device 20(C2) (registered device) predetermined to be connected to the device communication port 110(2) fails and needs to be replaced, in the conventional device communication managing unit 9, for example, when the comparison processing is executed in the first comparing pattern, the device 20 having a same form as the device 20(C2) (registered device) is connected to the device communication port 110(2).

As mentioned above, the comparison in the first comparing pattern is to compare the "vendor ID", "device ID" and "provision" and the "serial number" does not serve as the object to be compared. Therefore, even though the device 20 having a same form as the registered device (having the "vendor ID", "device ID" and "provision" as same as those of the registered device) is connected to a certain communication port, abnormal is not judged.

Besides, under the condition of high replacement urgency, before the device (device for replacement) capable of replacing the device 20(C2) (registered device) arrives, the support tool 60 is used to set a comparing function specific to the device communication port 110(2) to be invalidated, and replace with a general purpose device (for example, device 20(S1)) in the same size.

However, in such a replacing method, since the device capable of being connected to the device communication port 110(2) of the conventional device communication managing unit 9 is limited, the condition that there is no device for replacement in an urgent case is possible. At this point, before the device for replacement arrives, no device can be connected to the device communication port 110(2) of the conventional device communication managing unit 9 for use.

Further, in the conventional device communication managing unit 9, when the device 20 to be connected to the device communication port 110(2) is changed from the intelligent device 20(C2) to the conventional device 20(S1), i.e., when trying to invalidate the comparing function related to device communication port 110(2), the following problems occur:

First, when transmitting the data received from the device 20 (S1) communicating with the device communication port 110 in the first mode to the host controller 40, the conventional device communication managing unit 9 needs the allocation of the "first mode input data" map as shown in FIG. 5(A). As for the conventional device communication managing unit 9, since the "first mode input data" map is related to the allocation of the host controller 40, it is always necessary to allocate it to the host controller 40.

Therefore, the conventional device communication managing unit 9 does not require the allocation of the "first mode input data" map as illustrated in FIG. 5(A) when the device communication port 110 always communicates with the device 20 in the second mode since the allocation compresses a communication frequency band of host communication (communication through the field network 50).

Second, in the conventional device communication managing unit 9, when the device 20 to be connected to the device communication port 110(2) is changed from the intelligent device 20(C2) to the conventional device 20(S1), the user must change a program in the host controller 40. That is, when receiving the data received by the device communication port 110(2) from the device 20, the host controller 40 must change the program for reception processing or the like in the host controller 40 in response to the condition that the device 20 connected to the device communication port 110(2) is changed from the device 20(C2) to the device 20(S1).

Specifically, in response to changing the device 20 connected to the device communication port 110(2) from the device 20(C2) communicating with the device communication port 110(2) in the second mode to the device 20(S1) communicating with the device communication port 110(2) in the first mode must be matched, the program for reception processing in the host controller 40 must be changed as mentioned below.

That is, after the data acquired from the device 20(C2) communicating with the device communication port 110(2) in the second mode are stored to the "second mode input data (2)" as shown in FIG. 5(B-2) by the output data generating part 105, the data are transmitted to the field network 50 (through the host communication control part 130). In addition, in the "second mode input data (2)" as shown in FIG. 5(B-2), the switching on/off information output from the device 20(C2) is offset to be "bit 0".

Relatively, the data acquired from the device 20 communicating with the device communication port 110(2) in the first mode are offset to be the "bit 1" mapped by the "first mode input data" as shown in FIG. 5(A) by the output data generating part 105.

Therefore, in response to changing the device 20 connected to the device communication port 110(2) from the device 20(C2) communicating with the device communication port 110(2) in the second mode to the device 20(S1) communicating with the device communication port 110(2) in the first mode, an execution program of reception processing in the host controller 40 must be changed from the program for receiving and processing the "the second mode input data (2)" to the program for receiving and processing the "first mode input data" map.

Further, the switching on/off information output from the device 20(C2) is offset to "bit 0" in "the second mode input data (2)", and relatively, the switching on/off information output from the device 20(S1) is offset to "bit 1" in the "the first mode input data". Therefore, in order to receive and process the data acquired by the device communication port 110(2), the host controller 40 must change the execution program of the reception processing from the program referring to "bit 0" in "the second mode input data (2)" to the program referring to "bit 1" in the "first mode input data" map.

That is, in the conventional device communication managing unit 9, according to the types of the device 20 connected to the device communication port 110 (specifically, the device 20(S) or the device 20(C)), the data format for transmitting the data output from the device 20 to the field network 50 (host controller 40) and the data storage position in the data format are switched. Therefore, the following program must be installed in the host controller 40. The program can correctly receive the data output from the device 20 even though the data format and the data storage position in the data format are switched. Therefore, when the conventional device communication managing unit 9 is used, the number of labor hours for designing the program in the host controller 40 is large.

(Validation/Invalidation of the Comparing Function and Switching of IO Map)

FIG. 4 is a diagram for illustrating that the IO map allocated to the host controller 40 by the conventional device communication managing unit 9 and the validation/invalidation of the comparison function are associated with a communication mode.

The second line in a table shown in FIG. 4 indicates: in the conventional device communication managing unit 9, when the device communication port 110 is set to the second mode, the comparing function in the device communication port 110 is "validated". Further, the second line in the table shown in FIG. 4 indicates: the IO map in the second mode (when the comparing function is validated) becomes the "second mode input data" map as illustrated in FIGS. 5(B-1) to 5(B-4) (each of the second mode input data (1) to the second mode input data (4)).

A third line (input) and a fourth line (output) of the table shown in FIG. 4 indicate: in the conventional device communication managing unit 9, when the device communication port 110 is set to the first mode, the comparing function in the device communication port 110 is "invalidated". Further, the third line (input) and the fourth line (output) of the table shown in FIG. 4 indicate: the IO map in the first mode (when the comparing function is invalidated) becomes the "first mode input data" map as illustrated in FIG. 5(A).

As illustrated above, in the conventional device communication managing unit 9, the IO map is switched according to the validation/invalidation of the comparing function (specifically, the device 20 connected to the device communication port 110 is the device 20(S) or the device 20(C)).

(IO Map in the Conventional Device Communication Managing Unit)

FIG. 5(A) and FIGS. 5(B-1)-5(B-4) are diagrams illustrating the IO map transmitted by the conventional device communication managing unit 9 to the host controller 40.

The IO map that the conventional device communication managing unit 9 can allocate to the host controller 40 (the IO map that the host communication control part 130 transmits to the host controller 40) includes the "first mode input data" as illustrated in FIG. 5(A) and the "second mode input data" of each of the device communication ports 110(1), 110(2) . . . 110(n) as illustrated in each of the FIGS. 5(B-1) to 5(B-4).

FIG. 5 (A) illustrates an example of the "first mode input data". When the communication mode of a certain device communication port 110 is set to the first mode, the binary data such as the switching on/off information output from the device 20 connected to the certain device communication port 110 are allocated to the "first mode input data" map. The communication mode of the device communication port 110 is set to the first mode, such that the device 20(S) incapable of communicating in the second mode can be connected to the device communication port 110 for use.

In the "first mode input data" map, the binary data (1-bit data) output from the devices 20(1), 20(2) . . . 20(n) communicating with each of the device communication ports 110(1), 110(2) . . . 110(n) are stored side by side. That is, in the "first mode input data" map, bit offset positions of the binary data, acquired from the devices 20(1), 20(2) . . . 20(n) in the first mode, in the "first mode input data" map correspond to port numbers of the device communication ports 110(1), 110(2) . . . 110(n). For example, as illustrated in FIG. 5(A), the binary data (DI1) output from the device 20(1) is stored in "bit 0", the binary data (DI2) output from the device 20(2) is stored in "bit 1", and the data (DI3) output from the device 20(3) is stored in "bit 2". The conventional device conventional managing unit 9 parallelly transmits the binary data output from the devices 20(1), 20(2) . . . 20(n) communicating with each of the device communication ports 110(1), 110(2) . . . 110(n) in the first mode to the host controller 40, and thus communicates with the host controller 40 efficiently.

FIGS. 5(B-1)-5(B-4) respectively illustrate each of the "second mode input data (1)-(4)" received by each of the device communication ports 110(1), 110(2) . . . 110(4) from the devices 20(C1), 20(C2) . . . 20(C4) in the second mode. The conventional device communication managing unit 9 transmits the data received by the device communication port 110(1) from the device 20(C1) in the second mode as the second mode input data (1) illustrated in FIG. 5(B-1) to the host controller 40 (field network 50). Similarly, the conventional device communication managing unit 9 transmits the data received by each of the device communication ports 110(2), 110(3) and 110(4) from each of the devices 20(C2), 20(C3) and 20(C4) in the second mode as the second mode input data (2), the second mode input data (3) and the second mode input data (4) illustrated in FIGS. 5(B-2), 5(B-3) and 5(B-4) to the host controller 40 (field network 50).

That is, the data received by each of the device communication ports 110(1), 110(2) . . . 110(4) from the devices 20(C1), 20(C2) . . . 20(C4) in the second mode are used as the "second mode input data (1)" to the "second mode input data (4)" and transmitted to the host controller 40 (allocated to the host controller 40).

As illustrated above, in the conventional device communication managing unit 9, the IO map is switched according to the validation/invalidation of the comparing function (specifically, the device 20 connected to the device communication port 110 is the device 20 (S) or the device 20(C)).

Specifically, when transmitting the data acquired from the device communication port 110 (the device communication port 110 connected to the device 20(S)) of which the comparing function is invalidated to the field network 50 (host controller 40), the conventional device communication managing unit 9 uses the "first mode input data" map as illustrated in FIG. 5(A). Besides, when transmitting the data acquired from the device communication port 110 (connected to the device 20(C)) of which the comparing function is validated to the field network 50 (host controller 40), the conventional device communication managing unit 9 uses the "second mode input data" data format as illustrated in FIGS. 5(B-1) to (B-4).

In addition, the data size of each of the "second mode input data (1)" to "second mode input data (4)" is the IO size of each of the devices 20(C1)-(C4) communicating with each of the device communication ports 110(1), 110(2) . . . 110(4) in the second mode, and is variable from 1 byte to 32 bytes.

(Device Replacing Method for the Device Communication Managing Unit According to One Embodiment of the Present Invention)

In order to facilitate understanding of the processing executed in the device communication managing unit 10, first, the processing executed in the device communication managing unit 10 is organized as follows.

That is, the processing executed in the device communication managing unit 10 is a control method of the device communication managing unit 10 (slave device), in which the device communication managing unit 10 is connected to the host controller 40 (controller) as a master device through the field network 50 and has a device communication port 110 connected to the device 20, and the control method comprises: a mode setting step for setting the device 20 connected to the device communication port 110 to communicate in a first mode or a second mode, in which the first mode is a mode of only receiving 1-bit data and the second mode is a mode of receiving more than 1 bit of data; and a transmitting step for transmitting the data received from the device 20 communicating in the first mode to the field network 50 by using a following data format when the mode setting part sets the first mode, in which the data format is used for transmitting the data received from the device 20 to the field network 50 when the mode setting part sets the second mode.

According to the method, the transmitting step transmits the data acquired from the device 20 to the field network 50 when the first mode is set by using the data format for transmitting the data acquired from the device 20 to the field network 50 when the mode setting step sets the second mode. That is, the control method transmits the data acquired from the device 20 to the field network 50 by using the data format no matter the device 20 communicates in the first mode or the second mode.

Herein, under the condition that the data format used for transmission to the field network 50 is different according to the fact that the communication with the device 20 is carried out in the first mode or the second mode, the host controller 40 must acquire the following information. That is, the host controller 40 must acquire the information related to the data received by the host controller 40 from the device 20 being the data received from the device 20 in the first mode or the second mode. Besides, the host controller 40 must acquire the information related to how the data received from the device 20 in the first mode is stored to the data format corresponding to the first mode, and how the data received from the device 20 in the second mode is stored to the data format corresponding to the second mode.

In another aspect, the control method transmits the data received from the device 20 to the field network 50 by using the data format no matter the communication with the device 20 is in the first mode or the second mode. Therefore, the control method achieves the effects that the data format used for transmitting the data received from the device 20 to the field network 50 can be simplified, and the processing in the device communication managing unit 10 and the host controller 40 can also be simplified.

Besides, the method transmits the data received from the device 20 to the field network 50 by using a shared data format no matter the device 20 communicates in the first mode or the second mode, and thus achieves the effects that the device connected to the device communication managing unit 10 can be easily replaced without changing the reception processing in the master device, etc.

Different from the conventional device communication managing unit 9, the device communication managing unit 10 can carry out the setting of "comparing function: cancellation". That is, when receiving a notification indicating that the device 20 connected to a certain device communication port 110 is a device 20(S) from the device communication processing part 101, the mode setting part 104 executes the following three types of processing (a)-(c). That is, (a) the mode setting part 104 instructs the device communication processing part 101 to communicate with the device 20(S) in the first mode. Besides, (b) the mode setting part 104 instructs the comparing part 106 to "cancel (not execute comparison processing)" the comparison processing in the certain device communication port 110. Further, (c) the mode setting part 104 notifies the output data generating part 105 that the comparison processing in the certain device communication port 110 "has been cancelled (comparison processing has not been executed)". The details are described as follows.

In addition, the processing executed by the device communication managing unit 10 when "the comparing function is validated" and "the comparing function is invalidated" is same as that of the conventional device communication managing unit 9. Therefore, the processing executed by the device communication managing unit 10 when "the comparing function is cancelled" is focused below.

(Validation or Cancellation of the Comparing Function)

FIG. 6 is a diagram illustrating a case that the IO map allocated to the host controller 10 by the device communication managing unit 10 is always same regardless of the communication mode. That is, the device communication managing unit 10 does not switch the IO map under the condition of the "comparing function: cancellation (the first mode)" and the "comparing function: validation (the second mode)". Specifically, the device communication managing unit 10 does not need to allocate the "first mode input data" map (the map as illustrated in FIG. 5(A)) used when the conventional device communication managing unit 9 transmits the data required from the device 20 in the first mode to the host controller 40 in advance. The details are described as follows.

(Comparing Function: Validation)

A second line in the table shown in FIG. 6 indicates: in the device communication managing unit 10, when a certain device communication port 110 is set into the second mode, the comparing function in such certain device communication port 110 is set to a "validation" condition.

For example, when the device communication processing part 101 receives a notification indicating that the device 20 connected to a certain device communication port 110 is the device 20(C), the mode setting part 104 executes the following three types of processing (a)-(c). That is, (a) the mode setting part 104 instructs the device communication processing part 101 to communicate with the device 20(S) in the second mode. Besides, (b) the mode setting part 104 instructs a fact that the comparison processing in the certain device communication port 110 is "validated" (executing the comparison processing)" to the comparing part 106. Further, (c) the mode setting part 104 notifies the output data generating part 105 of a fact that the comparison processing in the certain device communication port 110 is "validated".

The second line in a table shown in FIG. 6 further instructs: the IO map during the second mode (i.e., the comparing function: validated) becomes the condition of the "second mode input data" ("second mode input data" of each port) as illustrated in FIGS. 8(B-1)-8(B-4).

That is, the data (the data acquired through communication with the device 20 in the second mode) acquired in the device communication port 110 set to be the second mode is stored to the data format ("second mode input data" data format) as illustrated in FIGS. 8(B-1)-8(B-4), and is transmitted to the field network 50 (host controller 40) (through the host communication control part 130).

Similar to each of the FIGS. 5(B-1) to 5(B-4), FIGS. 8(B-1) to 8(B-4) illustrate each of the "second mode input data (1)-(4)" storing the data received by each of the device communication ports 110(1), 110(2) . . . 110(4) from the devices 20(C1), 20(C2) . . . 20(C4) in the second mode.

The output data generating part 105 stores the data acquired in the device communication port 110 set to be the second mode (the data acquired by communication with the device 20 in the second mode), that is, the data acquired in the device communication port 110 of which the comparing function is set to be validated, to the "second mode input data" data format as illustrated in FIGS. 8(B-1) to 8(B-4) (i.e., FIGS. 5(B-1) to (B-4)) and transmits the same to the field network 50 (host controller 40) (through the host communication control part 130). Each of the device communication port 110(1), 110(2) . . . 110(4) transmits the data received from the devices 20(C1), 20(C2) . . . 20(C4) in the second mode as the "the second mode input data (1)" to "the second mode input data (4)" to the host controller 40.

(Comparing Function: Cancelled)

A third line in a table shown in FIG. 6 indicates: in the device communication managing unit 10, when a certain communication port 110 is set to be the first mode, the comparing function in the certain device communication port 110 is set to be the "cancelled" condition.

For example, when a notification indicating that the device 20 connected to a certain device communication port 110 is the device 20(S) is received from the device communication processing part 101, the mode setting part 104 executes the three types of processing (a)-(c). That is, (a) the mode setting part 104 instructs the device communication processing part 101 to communicate with the device 20(S) in the second mode. Besides, (b) the mode setting part 104 instructs the comparing part 106 to "cancel (not execute comparison processing)" the comparison processing in the certain device communication port 110. Further, (c) the mode setting part 104 notifies the output data generating part 105 that the comparison processing in the certain device communication port 110 "has been cancelled".

That is, when the notification indicating that the device 20 connected to a certain device communication port 110 is the device 20(S) is received from the device communication processing part 101, the mode setting part 104 instructs the device communication processing part 101 to communicate with the device 20(S) in the first mode in the certain device communication port 110.

The device communication processing part 101 (the device communication reception processing part 102 and the device communication transmission processing part 103) receiving the instruction from the mode setting part 104 communicates with the device 20(S) in the first mode. That is, the device communication processing part 101 can communicate with the device 20(S), which is not the device 20(C), serving as, for example, a switching on/off sensor (capable of connecting the device 20(S) to the certain device communication port 110) in the certain device communication port 110.

The third line in the table shown in FIG. 6 further instructs: the IO map during the first mode (i.e., the comparing function: cancellation) becomes the condition of the "second mode input data" as illustrated in FIGS. 7(A) and 7(B) and FIGS. 8(B-1)-8(B-4).

That is, the output data generating part 105 receiving the notification indicating that the comparison processing in the certain device communication port 110 is cancelled (the device 20 connected to the certain device communication port 110 is the device 20(S)) from the mode setting part 104 executes the following processing.

The output data generating part 105 transmits the input data acquired in the certain device communication port 110 in the first mode (that is, the data acquired from the communication with the device 20(S) in the first mode in the certain device communication port 110) to the field network 50 (host controller 40) (through the host communication control part 130) by using the "second mode input data" data format as illustrated in FIGS. 7(A) and 7(B) and FIGS. 8(B-1)-8(B-4). Specifically, the output data generating part 105 offsets (stores) the first mode input data acquired in the certain device communication port 110 (the binary data and 1-bit data such as the switching on/off information output from the device 20(S)) to the "bit 0" of the "second mode input data" data format. Besides, the output data generating part 105 stores a fixed value (for example "0") in a position except for the "bit 0" of the "second mode input data" data format.

When acquiring a notification indicating that comparing function is cancelled from the mode setting part 104, the output data generating part 105 transmits the "second mode input data" storing the data (first mode input data: bit 0, fixed value (for example, "0"): bits 1 to 15) to the field network 50 (host controller 40) as the data acquired in the certain device communication port 110 (through the host communication control part 130).

That is, the IO map for transmitting the data acquired from the certain device communication port 110 (through the host communication control part 130) to the field network 50 (host controller 40) is the same regardless the communication mode (first mode or second mode) set for the certain device communication port 110.

Specifically, the output data generating part 105 transmits the second mode input data "storing the switching on/off information (binary data) output from the device 20 in 0th bit of a header data byte" to the field network 50 (host controller 40) (through the host communication control part 130) no matter the device 20 (for example, sensor) connected to the device communication port 110 is the device 20(S) or the device 20(C).

As illustrated above, in the device communication managing unit 10, when the mode setting part 104 sets the first mode, the output data generating part 105 stores the 1-bit data received from the device 20 to a predetermined position of the data format and stores a predetermined value in a position except for the predetermined position of the data format.

According to the configuration, when the mode setting part 104 sets the first mode, the output data generating part 105 stores the 1-bit data received from the device 20 to a predetermined position of the data format and stores a predetermined value in a position except for the predetermined position of the data format. That is, the device communication managing unit 10 transmits the data received from the device 20 to the field network 50 by using the data format no matter communicating with the device 20 in the first mode or the second mode, and stores the data received from the device 20 in the first mode to the predetermined position of the data format.

Therefore, the device communication managing unit 10 achieves the following effects: that is, when the data format is used to transmit the data received from the device 20 in the first mode to the field network 50, the device communication managing unit 10 is unnecessarily to notified the host controller 40 of the data received from the device 20 in the first mode being stored to which position of the data format every time. That is, the device communication managing unit 10 achieves the effects that the data format used for transmitting the data received from the device 20 to the field network 50 can simplified, and the processing in the device communication managing unit 10 and the host controller 40 can also be simplified.

(IO Map Used for the Device Communication Managing Unit According to One Embodiment of the Present Invention)

FIG. 7(A) and FIG. 7(B) are diagrams illustrating a case that for the data transmitted to the host controller 40 by the device communication managing unit 10, a data format/IO map is switched not according to the communication mode (first mode or second mode) of the device communication port 110.

Specifically: FIG. 7(A) represents an image of an IO map when the device communication managing unit 10 transmits the data received from the device 20 by the device communication port 110 to the host controller 40 when the comparing function: validated is enabled. Besides, FIG. 7(B) represents an image of an IO map when the device communication managing unit 10 transmits the data received from the device 20 by the device communication port 110 to the host controller 40 when the comparing function: cancelled is enabled.

(Data Example when the Comparing Function: Validated is Enabled)

When the comparing function is validated, (that is, the device 20 connected to the device communication port 110 is the device 20(C)), the output data generating part 105 transmits the data as shown in FIG. 7(A) (through the host communication control part 130) to the field network 50 (host controller 40). That is, the output data generating part 105 stores the data (more than 1 bit of data) acquired through communication between the device communication port 110 and the device 20(C) in the second mode to the "second mode input data" data format as illustrated in FIGS. 8(B-1) to 8(B-4) and transmits the same to the host controller 40.

The output data generating part 105 transmits the "second mode input data" data format that stores the switching on/off information (binary data) output from the device 20(C) in 0th bit of a header data byte and stores the data except for the above data (analog data such as status information of the device 20(C)) in 1st bit to 15th bit to the host controller 40.

(Data Example when the Comparing Function: Cancelled is Enabled)

The mode setting part 104 receiving the notification indicating that "the device 20 connected to the certain device communication port 110 is the device 20(S)" from the device communication processing part 101 instructs the output data generating part 105 to transmit the data as shown in FIG. 7(B) (through the host communication control part 130) to the field network 50 (host controller 40). That is, the output data generating part 105 stores the data acquired by communication between the device communication port 110 and the device 20(S) in the first mode (the binary data, 1-bit data such as the switching on/off information) to the "second mode input data" data format as illustrated in FIGS. 8(B-1) to 8(B-4) and transmits the same to the host controller 40.

The output data generating part 105 transmits the "second mode input data" data format that stores the switching on/off information (binary data) output from the device 20(C) in 0th bit of a header data byte and stores a fixed value (for example 0) in 1st bit to 15th bit to the host controller 40.

As illustrated above, the device communication managing unit 10 does not switch the IO map under the condition of the comparing function: cancelled (the first mode) and the comparing function: validated (the second mode). That is, the output data generating part 105 stores the data acquired from the device 20 to the "second mode input data" data format under the condition that the comparing function is cancelled (first mode) and the condition that the comparing function is validated (second mode) and transmits the same (through the host communication control part 130) to the field network 50 (host controller 40). The device communication managing unit 10 does not need to allocate the "first mode input data" map (the map as illustrated in FIG. 5(A)) used when the conventional device communication managing unit 9 acquires the data from the device 20 in the first mode to the host controller 40 to the host controller 40 in advance.

(Transmission Data of the Device Communication Managing Unit According to One Embodiment of the Present Invention)

FIGS. 8(B-1) to 8(B-4) are diagrams illustrating the data transmitted to the host controller 40 by the device communication managing unit 10 according to a communication mode and a device communication port. In addition, in FIGS. 8(B-1) to 8(B-4), the comparing function of the device communication port 110(2) is set to be cancelled, and the comparing function of other device communication ports 110(1), 110(3) and 110(4) is set to be validated.

That is, when receiving the notification indicating that the device 20 connected to the device communication port 110(2) is changed from the device 20(C) to the device 20(S) from the device communication processing part 101, the mode setting part 104 (*a*) instructs the device communication processing part 101 to change the connection setting (communication mode) of the device communication port 110(2) from the second mode to the first mode.

When the device communication processing part 101 receives the notification indicating that the device 20 connected to the device communication port 110(2) is the device 20(S), the mode setting part 104(*c*) notifies the output data generating part 105 that the comparison processing in the device communication port 110(2) is changed from "validation" to "cancellation".

For the IO map (data format) used when the data (1-bit data) acquired from the device 20(S) connected to the device communication port 110(2) is transmitted to the host controller 40, the output data generating part 105 still maintains in the second mode. That is, the output data generating part 105 transmits the "second mode input data" data format (data as illustrated in FIG. 8(B'-2)) that stores the switching on/off information (binary data) output from the device 20(S) connected to the device communication port 110(2) in 0th bit of a header data byte and stores a fixed value in 1st bit to 15th bit (for example, 0) to the host controller 40.

The output data generating part 105 of the device communication managing unit 10 still sets the "bit 0" of the "second mode input data" data format in a storage position of the binary data (1-bit data) such as the switching on/off information output from the device 20(S) under the condition that the device 20(S) is connected to the device communication port 110(2).

That is, the output data generating part 105 stores the binary data (1-bit data) such as the switching on/off information output from the device 20 to the 0th bit of the header data byte of the "second mode input data" data format no matter the device 20 connected to the device communication port 110 is the device 20(S) or the device 20 (C).

The device communication managing unit 10 can increase a range of the device that can be easily replaced when the device 20(C2) predetermined to be connected to the device communication port 110(2) fails and needs to be replaced. Specifically, the user can use the device 20(S1) to replace the device 20(C2) to connect with the device communication port 110(2) for use without a need of changing the program of the host controller 40. That is, the device communication managing unit 10 can connect the device 20(S) (for example, a general purpose switching on/off sensor) instead of the device 20(C) to the device communication port 110(2) without a need of changing the program in the host controller 40. There are many alternatives (general purpose device 20(S)) that can be connected to the device communication port 110 without changing the program of the host controller 40 by the device communication managing unit 10 even when the device 20(C) fails.

Therefore, even under the condition that the device 20(C) predetermined to be connected to the device communication port 110 fails, etc., the device 20(S) can be used to replace it for use without changing the program of the host controller 40, and therefore the control system 1 can operate without stopping even during an ordering period of the registered device 20(C).

(About IO-Link)

In the control system 1, the device communication managing unit 10 can communicate with the device 20 by using IO-Link®. An outline of the IO-Link is described hereinafter.

The IO-Link is standardized with the name (Single-drop digital communication interface for small sensors and actuators) (SDCI), and is a standardized technology for the communication between a host (PLC) as a control device (for example, the host controller 40 in the control system 1) and devices such as a sensor and an actuator (for example, the device 20 in the control system 1). IO-Link is a new point to point serial communication protocol for the communication between the host (PLC) and the devices such as the sensor and the actuator.

Different from the conventional protocol (for example a communication protocol of the first mode in the control system 1) in which a switching on/off signal (1 bit) can only be transmitted from the device to the host (PLC), IO-Link is a communication protocol (for example a communication protocol of the second mode in the control system 1) capable of carrying out the data transceiving (two-way communication) of 32 bytes (256 bits). By the IO-Link connection between the host (PLC) and the devices such as the sensor and the actuator, the signal from the conventional device which can only receive the binary data such as the switching on/off information can be acquired in a form of a value of 32 bytes. Therefore, under the condition of a photoelectric sensor, for example, information such as amount of received light, detection margin, internal temperature, etc., can be acquired, which may contribute not only to investigate the cause of the problem, but to diagnose the product life and change a threshold value corresponding to aged deterioration.

By using the IO-Link, for example, the automation of setting, maintenance, etc., of the device can be realized. Besides, by using IO-Link, the programming of the host (PLC) can be greatly simplified, and further, the cost reduction of the wiring cable can be realized. As an example of the device, the photoelectric sensor and a proximity switch can be listed.

(IO-Link System)

The IO-Link system comprises an IO-Link device (generally, a sensor, an actuator or a combination thereof), a standard tri-wire sensor/actuator cable and an IO-Link master (for example, the device communication managing unit 10 in the control system 1).

Herein, the IO-Link master has one or more ports, and each port can be connected to an IO-Link device. The IO-Link master and the IO-Link device carry out point to point communication. The IO-Link master may transceive the information (more than 1 bit of data), such as recognition information of the device, communication properties of the device, information of device parameters and process/diagnostic data and the like, other than the binary data such as the switching on/off information with the IO-link device instead of transceiving the conventional binary data (1-bit data) such as the switching on/off information.

The IO-Link device is a device which can receive and transmit more than 1 bit of data with the IO-Link master (for example, the device 20(C) in the control system 1).

(Two Communication Modes)

The IO-Link device can operate without the IO-Link master in the conventional digital replacement mode (for example, the first mode in the control system 1) called as Standard IO (SIO), that is, can operate by using the host which can only receive the binary data such as the switching on/off information with the sensor. Likewise, the IO-Link master can use the SIO to actuate the conventional device (the device that can only receive the binary data such as the switching on/off information with the IO-Link host, for example, the device 20(S) in the control system 1).

The port of the IO-Link master holds configuration data. If a certain port is set to be the SIO mode, then the IO-Link master enables such port to operate similar to the conventional port (the port that can only receive and transmit the binary data such as the switching on/off information). If the port is set to be a communication mode (COM mode) (for example, the second mode in the control system 1), then the IO-Link master and the device connected to such port (IO-Link device; for example, the device 20(C) in the control system 1) can receive and transmit more than 1 bit of data.

(About the Comparing Function)

By using the IO-Link, the information other than the switching on/off data can be acquired from the devices (IO-Link device) such as a sensor and an actuator. Specifically, the recognition information (vendor ID, device ID, provision, serial number) of the device can be acquired.

The IO-Link master has a comparing function of comparing the device predetermined to be connected to with the device actually connected to such port at each port. The IO-Link master executes the comparison processing at the moment of establishing the IO-Link communication. The IO-Link host, for example, acquires the recognition information of the device and the communication properties of the device from the connected IO-Link device when the port is connected to the IO-Link device.

Besides, the IO-Link master prestores configuration information including the recognition information of the device (IO-Link device) predetermined to be connected to each port.

The IO-Link master acquires the recognition information of the device (IO-Link device) predetermined to be connected to the port by referring to the configuration information, and judges whether the recognition information and the recognition information of the device (IO-Link device) actually connected to the port are consistent.

For example, the IO-Link master judges whether the "vendor ID, device ID, IO-Link provision and serial number" of the device predetermined to be connected are consistent with those of the actually connected device. When inconsistent, the IO-Link master stops the IO-Link communication.

In addition, the recognition information used when the IO-Link master carries out the comparison processing can be selected from any of the two following types. First, the IO-Link master can use the vendor ID, device ID and IO-Link provision for comparison processing (simple comparing function). Second, the IO-Link master can use the vendor ID, device ID, IO-Link provision and serial number for comparison processing (detailed comparing function). Herein, under the condition of not referring to the serial number during comparing, if the registered device is the device of the same type (the device same as the registered device in the vendor ID, device ID and IO-Link provision besides the serial number), then even if the serial numbers are not consistent, the IO-Link master still judges as normal, and thus carries out IO-Link communication with the replaced device.

(Implementation Example by Software)

A control block of the device communication managing unit 10 (particularly each of the host communication control part 130 and the device communication control part 100) can be realized by a logic circuit (hardware) integrated in an integrated circuit chip (IC chip) and can also be realized by software by using a Central Processing Unit (CPU).

Under the latter condition, the device communication managing unit 10 includes a CPU that executes the instructions of a program which is software for implementing each function, a Read Only Memory (ROM) or a storage device (they are called "recording medium") recording the program and various data and capable of being read by a computer (or CPU), and a Random Access Memory (RAM) for developing the program, etc. In addition, through reading and executing the program from the recording medium by the computer (or CPU), the purpose of the present invention is achieved. As the recording medium, a "non-transitory tangible medium", for example, a tape, a disk, a card, a semiconductor memory, a programmable logic circuit, etc., can be used. Besides, the program can be provided for the computer through any transmission medium (communication network or broadcast waves) capable of transmitting the program. In addition, the present invention can also be implemented in a form of a digital signal embedded in a carrier wave and the program being embodied by electronic transmission.

The present invention is not limited to the mentioned respective embodiments, and can be subjected to various changes in a scope shown in claims, and the embodiments obtained by properly combining the technical parts respectively disclosed in different embodiments also fall within a technical scope of the present invention.

What is claimed is:

1. A slave device, having a host communication port connected to a first controller as a master device through a network, a device communication port connected to a device, and a processor in communication with a memory storing instructions where the processor is configured to:
   set the device connected to the device communication port to communicate in a first mode or a second mode, the first mode being a mode of only receiving 1-bit data and the second mode being a mode of receiving more than 1 bit of data;
   store configuration information comprising recognition information of the device predetermined to be connected to the communication port; and
   execute comparison processing when the second mode is set, and execute no comparison processing when the first mode is set, wherein the comparison processing is for determining a consistency of the recognition information of the device included in the data received from the device and larger than 1 bit and the recognition information included in the configuration information being stored; and
   transmit the data received from the device to the network through the host communication port using a predetermined data format regardless of whether the comparison processing is executed, wherein
   the predetermined data format wherein comprises:
   a first position for storing only 1-bit data at which the 1-bit data received from device is stored regardless of whether the comparison processing is executed; and
   a second position at which data other than the data stored in the first position among the data received from the device is stored when the comparison processing is executed, and 0 is stored when the comparison processing is not executed.

2. A control method, being a control method of the slave device having a host communication port connected to a first controller as a master device through a network, a device communication port connected to a device, a storage device storing configuration information comprising recognition information of the device predetermined to be connected to the communication port, and a processor in communication with a memory storing instructions, the control method comprising:
   setting the device connected to the communication pot to communicate in a first mode or a second mode by the processor, wherein the first mode is a mode of only receiving 1-bit data and the second mode is a mode of receiving more than 1 bit of data;
   executing comparison processing when the second mode is set, and executing no comparison processing when the first mode is set, wherein the comparison processing is for determining a consistency of the recognition information of the device included in the data received from the device and larger than 1 bit and the recognition information included in the configuration information being stored; and
   transmitting the data received from the device to the network through the host communication port using a predetermined data format by the processor regardless of whether the comparison processing is executed, wherein
   the predetermined data format comprises:
   a first position for storing only 1-bit data at which the 1-bit data received from device is stored regardless of whether the comparison processing is executed; and
   a second position at which data other than the data stored in the first position among the data received from the device is stored when the comparison processing is executed, and 0 is stored when the comparison processing is not executed.

3. A non-transitory computer-readable recording medium, recording an information processing program configured to use a computer as the slave device according to claim 1 to exert functions.

* * * * *